United States Patent
Williams et al.

(10) Patent No.: US 7,233,723 B2
(45) Date of Patent: Jun. 19, 2007

(54) OPTOELECTRONIC ASSEMBLY WITH COUPLING FEATURES FOR ALIGNMENT

(75) Inventors: James Howard Williams, Walnut Creek, CA (US); Brenton Arthur Baugh, Palo Alto, CA (US); Robert H. Yi, San Jose, CA (US); Robert Edward Wilson, Palo Alto, CA (US); Kendra Jolene Gallup, Marina del Rey, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/903,564

(22) Filed: Jul. 29, 2004

(65) Prior Publication Data

US 2006/0023998 A1 Feb. 2, 2006

(51) Int. Cl.
*G02B 6/32* (2006.01)
*G02B 6/36* (2006.01)

(52) U.S. Cl. .............. 385/33; 385/39; 385/49; 385/52; 385/88; 385/89; 385/92; 385/93

(58) Field of Classification Search ............. 385/31, 385/33, 35, 39, 49, 52, 88, 89, 92, 93
See application file for complete search history.

(56) References Cited

U.S. PATENT DOCUMENTS 5,904,350 A * 5/1999 Creighton et al. .......... 271/227
6,253,004 B1 * 6/2001 Lee et al. ..................... 385/31
6,527,458 B2 * 3/2003 Kim .............................. 385/89
6,661,951 B1 12/2003 Blair et al.
6,756,650 B2 * 6/2004 Huang ........................ 257/434
6,795,461 B1 * 9/2004 Blair et al. ................... 372/36
6,901,221 B1 * 5/2005 Jiang et al. ................. 398/138
2004/0033033 A1 2/2004 Hoshino et al.
2004/0101020 A1 5/2004 Bhandarkar

OTHER PUBLICATIONS

A partial copy of GB Search Report for Application No. GB0513065.3 completed on Oct. 4, 2005 (1 page).

* cited by examiner

*Primary Examiner*—Frank G. Font
*Assistant Examiner*—Michael P. Mooney

(57) ABSTRACT

An optoelectronic assembly includes an optical lens element (OLE) coupled to a substrate. The substrate includes a transducer, a standing structure on the transducer, a transducer lens supported by the standing structure over the transducer, and alignment features. The OLE includes an OLE lens and co-alignment features that couple with the alignment features on the optoelectronic assembly. When the substrate is coupled to the OLE, the transducer lens is aligned with the OLE lens.

21 Claims, 7 Drawing Sheets

OPTOELECTRONIC ASSEMBLY WITH COUPLING FEATURES FOR ALIGNMENT

BACKGROUND OF THE INVENTION

Optical signals are increasingly used in communication networks to carry data. These communication networks use optoelectronic modules (such as optical transmitters, receivers, and transceivers) to transmit and receive optical signals.

In an optoelectronic module, a light source (such as a laser in a transmitter or an optical fiber in a receiver) must be accurately aligned with a lens and a target (such as an optical fiber in a transmitter or a photodiode in a receiver) in order for the optical signals to be properly routed through the communication network.

FIG. 1 shows a diagram of a conventional optical path in an optoelectronic transmitter 11. The optoelectronic transmitter 11 includes a laser 13, coupling optics 15, and an optical fiber 17. The coupling optics 15 receives light from the laser 13 and focuses it onto the optical fiber 17. The coupling optics 15 is a single unit having a first lens surface 19 and a second lens surface 21. Positioning the coupling optics is difficult because the first lens surface 19 must be aligned with laser 13 while simultaneously aligning the second lens surface 21 with the optical fiber 17.

Consequently, active alignment is needed to carefully place each component such that the light from the light source will be focused exactly on the target. For example, during active alignment of the optoelectronic transmitter 11, the laser 13 is switched on while the positions of the coupling optics 15 and optical fiber 17 are adjusted. The power of the optical signal received by the optical fiber 17 is measured. The laser 13, coupling optics 15, and optical fiber 17 are considered to be at an optimal alignment when the optical power measured is at a maximum level. At this point, the positions of the laser 13, coupling optics 15, and optical fiber 17 are fixed in place with respect to one another.

Active alignment is time consuming and expensive. It requires precision mechanical equipment to achieve the alignment, as well as optoelectronic test equipment to power and monitor the system.

SUMMARY OF THE INVENTION

In accordance with an aspect of the present invention, an optoelectronic assembly uses a lens system comprising a first lens to collimate light from a light source, and a second lens to focus the collimated light onto a target. The first lens is fixed in position relative to the light source, and the second lens is fixed in position relative to the target. The first and second lenses are aligned using components with features designed to couple together.

One specific embodiment of the invention is an optoelectronic assembly that includes an optical lens element (OLE) coupled to a substrate. The substrate includes a transducer, a standing structure on the transducer, a transducer lens supported by the standing structure over the transducer, and alignment features. The OLE includes an OLE lens and co-alignment features that couple with the alignment features on the substrate. When the substrate is coupled to the OLE, the transducer lens is aligned with the OLE lens.

In one embodiment, the alignment features on the substrate are plugs and the co-alignment features on the OLE are sockets. In another embodiment, the alignment features on the substrate are sockets and the co-alignment features on the OLE are plugs.

Further features and advantages of the present invention, as well as the structure and operation of preferred embodiments of the present invention, are described in detail below with reference to the accompanying exemplary drawings.

BRIEF DESCRIPTION OF THE DRAWINGS

FIG. 3A is a top view, FIG. 3B is a side view, and FIG. 3C is a rear view.

FIG. 4A is a top view, and FIG. 4B is a cross-sectional view taken through the dotted line 48–48' in FIG. 4A.

FIG. 5A illustrates a cross-sectional view of FIG. 2 taken through the dotted line 36–36'. FIG. 5B illustrates a cross-sectional view of FIG. 2 taken through the dotted line 37–37'. FIG. 5C shows an exploded view of the dotted box 63 of FIG. 5B.

FIG. 6B illustrates a cross-sectional view of FIG. 6B taken through the dotted line 82–82'.

Drawings are not to scale. Use of the same reference numbers in different figures indicates similar or identical elements.

DETAILED DESCRIPTION

Figure 1:
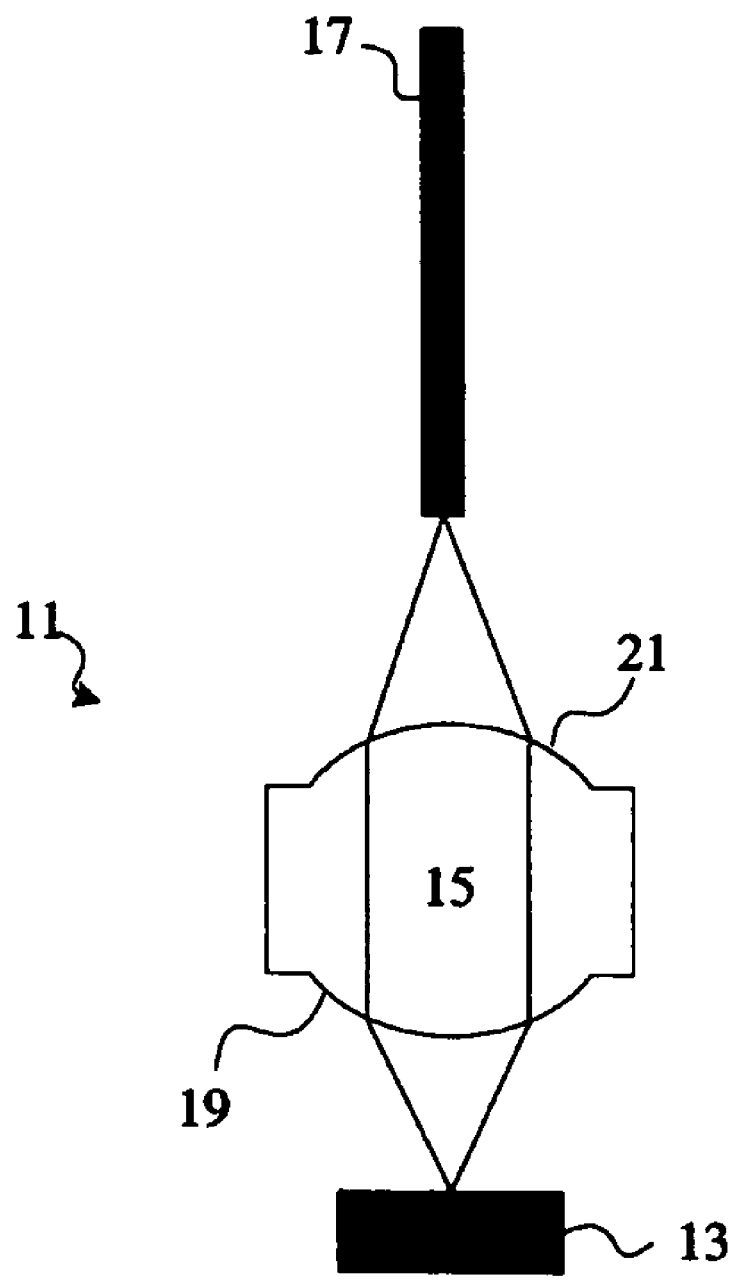
FIG. 1 shows a diagram of a conventional optical path in an optoelectronic transmitter 11.
Figure 2:
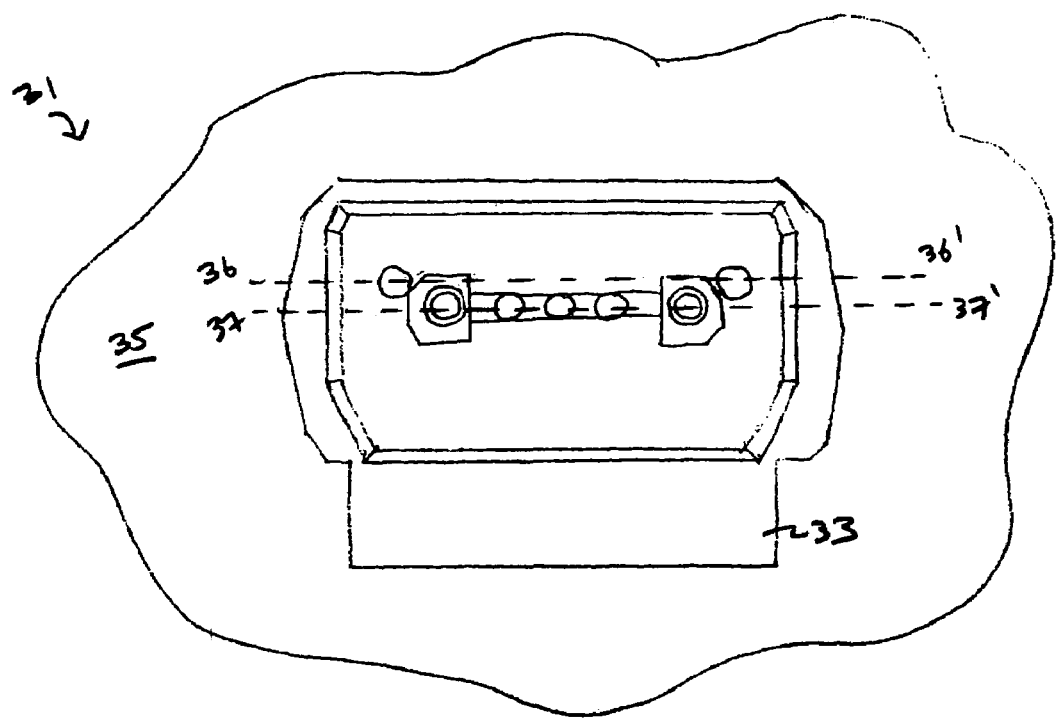
FIG. 2 illustrates an embodiment of an optoelectronic assembly.

FIG. 2 illustrates an embodiment of an optoelectronic assembly 31, made in accordance with the teachings of the present invention. The optoelectronic assembly 31 includes an optical lens element (OLE) 33 coupled to a substrate 35.

Figure 3A:
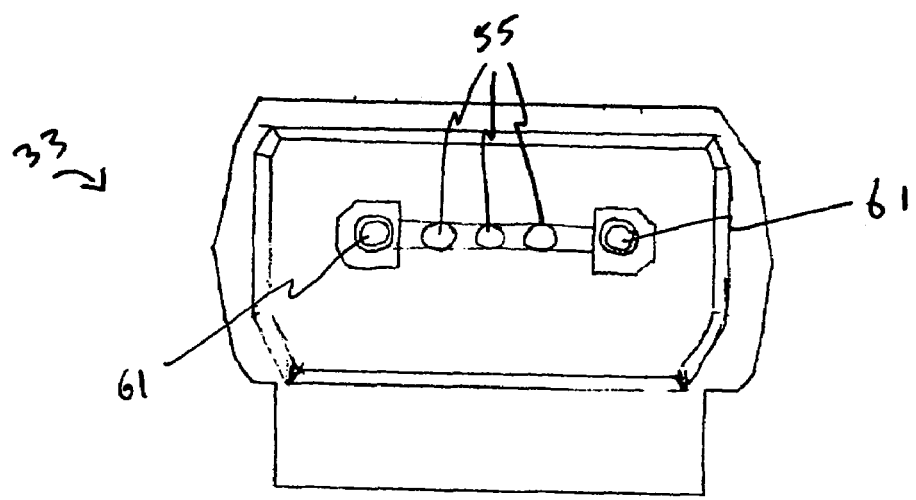
FIGS. 3A–3C illustrate the optical lens element from several perspectives.
Figure 3B:
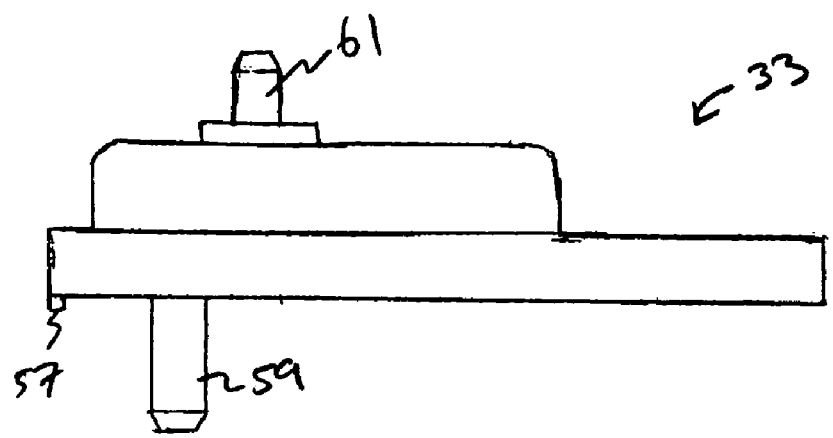
Figure 3C:
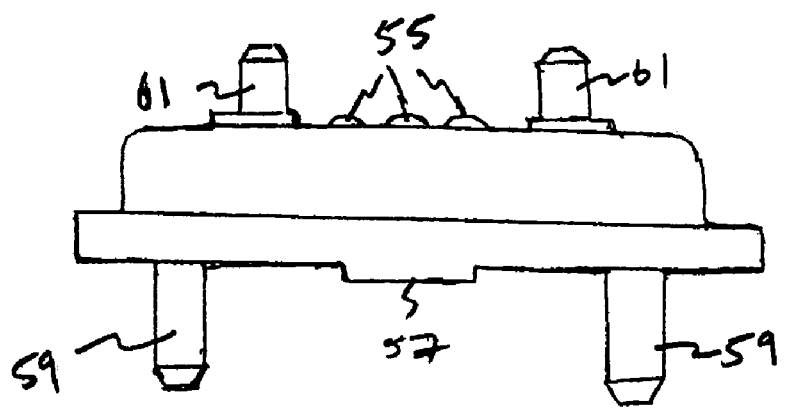

FIGS. 3A–3C illustrate the OLE 33 from several perspectives. The OLE 33 includes an array of OLE lenses 55 and male alignment features that align the OLE 33 to the substrate 35. In an exemplary embodiment, the alignment features are plugs 59 that protrude from the OLE 33, and are formed as an integral part of the OLE 33. Although only two plugs 59 are shown in FIG. 3B, as few as one or more than two alignment features may be used to provide the same alignment functionality.

The positions of the OLE lenses 55 in the OLE 33 are fixed relative to the location of the plugs 59. Preferably, the OLE lenses 55 are formed as an integral part of the OLE 33. In an exemplary embodiment, the OLE 33 and integral OLE lenses 55 are molded out of Ultem or a similar optically transparent material. The OLE lenses 55 may also be formed in a separate component that is subsequently attached to the OLE 33.

A tab 57 protrudes from the OLE 33, and may be used to keep the OLE lenses 55 at a predetermined distance from the substrate 35 when the OLE 33 is coupled to the substrate 35. However, the distance of the OLE lenses 55 from the substrate 35 is not critical to the design of the OLE 33, as will be discussed later.

The OLE 33 includes connectors 61 for coupling with a fiber optic ferrule (not shown). The positions of the connectors 61 are fixed relative to the OLE lenses 55. When a fiber optic ferrule is coupled to the connectors 61, the fibers within the fiber optic ferrule are aligned to the OLE lenses 55 in the OLE 33. Although the connectors 61 are shown as posts, other types of connectors may also be compatible with a fiber optic ferrule. In an exemplary embodiment, the fibers used with the optoelectronic assembly 31 are multi-mode fibers.

Figure 4A:
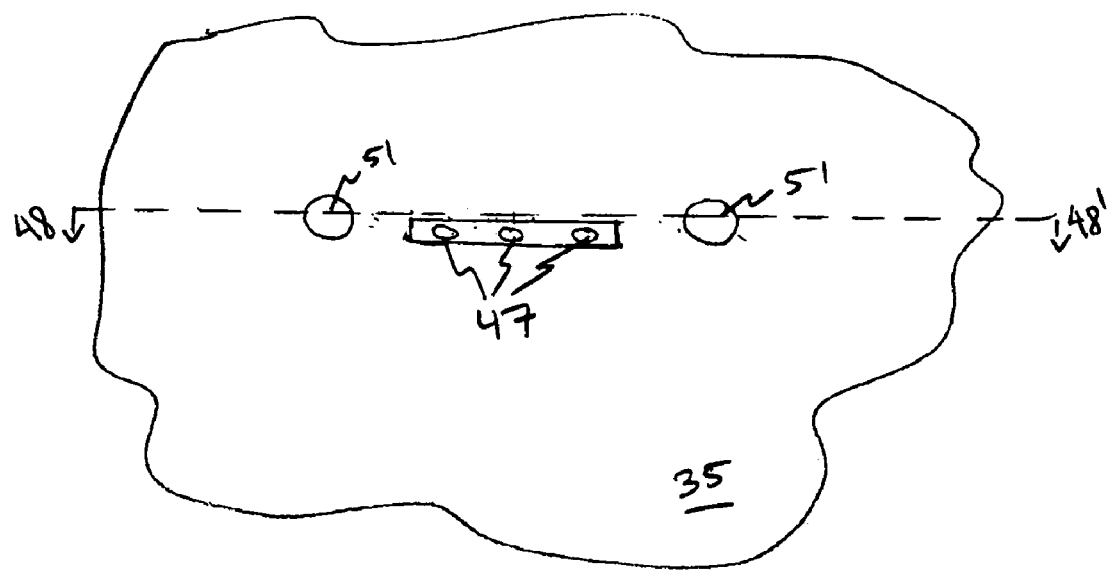
FIGS. 4A–4B illustrate the substrate from different perspectives.
Figure 4B:
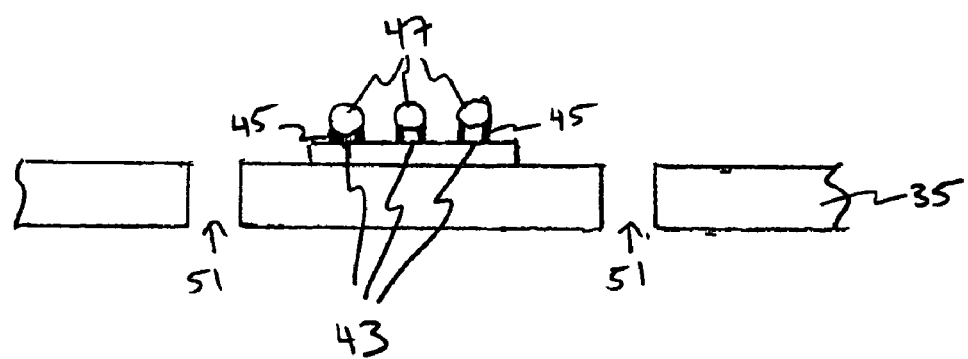

FIGS. 4A–4B illustrate the substrate 35. The substrate 35 can be a printed circuit board, flexible printed circuit board, ceramic, silicon, a stainless steel leadframe, or a similar substrate. The substrate 35 has female co-alignment features that couple with the male alignment features on the OLE. In an exemplary embodiment, the co-alignment features are sockets 51 in the substrate 35. Although only two sockets 51 are shown in FIG. 3B, as few as one or more than two co-alignment features may be used to provide the same alignment functionality.

An array of optoelectronic transducers 43 ("transducers") is located on the substrate 35. The transducer 43 may be a light source (such as a laser) or a photodetector (such as a photodiode). In an exemplary embodiment of the invention, each transducer 43 is a Vertical Cavity Surface Emitting Laser (VCSEL). Although a plurality of transducers 43 is shown in FIG. 3, the present invention includes embodiments with only a single transducer as well. The position of the transducers 43 is fixed relative to the location of the sockets 51.

Each transducer 43 has a standing structure 45 formed upon its surface. A transducer lens 47 is attached to each standing structure 45 and is held in place over the active region of each transducer 43, wherein "active region" is defined to be the light-emitting or light-detecting portion of the transducer 43. The standing structure 45 is designed to position the active region with great precision at the focal point of the transducer lens 47. In an exemplary embodiment of the invention, the transducer lens 47 is a ball lens.

To achieve such precise positioning of the standing structure 45 and the transducer lens 47, the standing structure 45 is typically formed using photolithographic techniques, such as those used in semiconductor fabrication and processing. The standing structure may be formed of photoresist, polyimide, or other material that can be formed and patterned by photolithographic techniques.

Figure 5A:
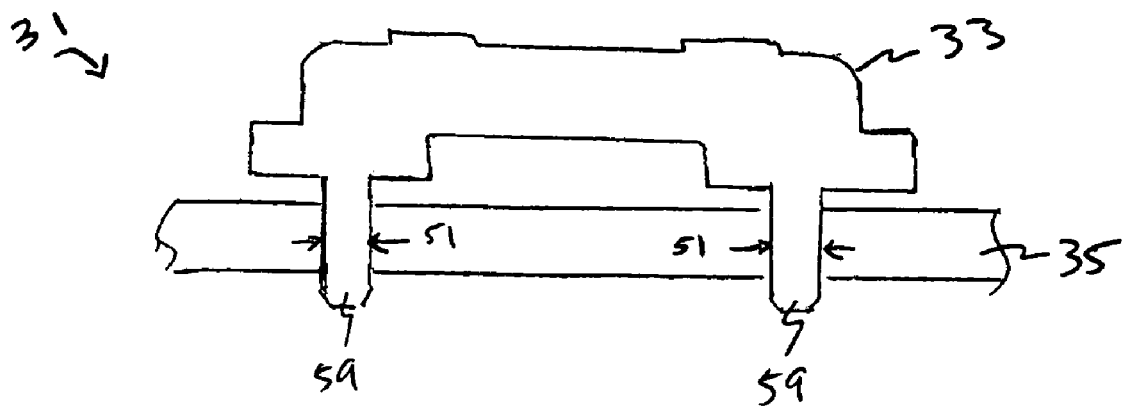
FIGS. 5A–5C illustrate the assembled optoelectronic assembly.
Figure 5B:
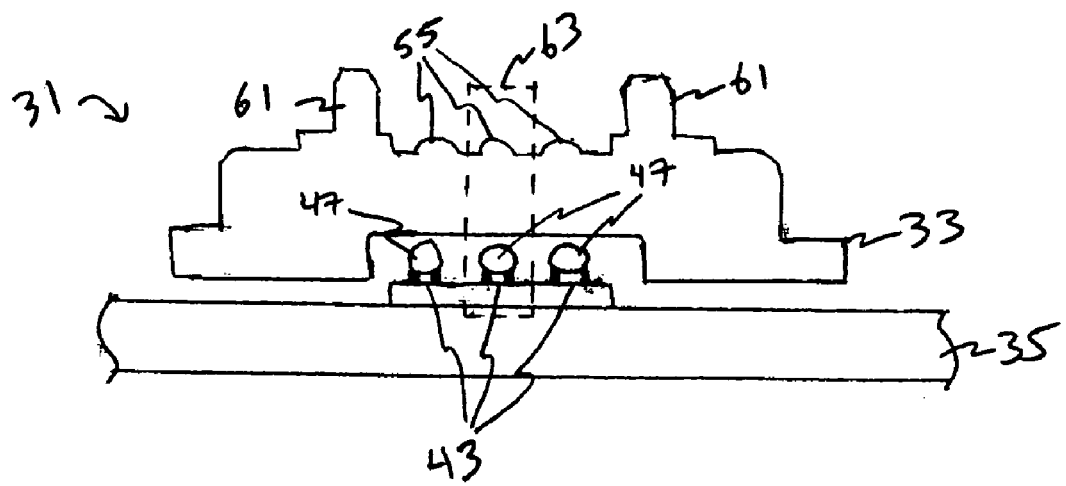

FIGS. 2, 5A–5B illustrate the alignment features on OLE 33 coupled with the co-alignment features on the substrate 35 to form the optoelectronic assembly 31. In an exemplary embodiment, the plugs 59 on the OLE 33 couple tightly with the sockets 51 in the substrate to hold the OLE 33 to the substrate 35. This coupling can be a snap-fit, slip-fit, or press-fit coupling. When the OLE 33 is joined to the substrate 35, each OLE lens 55 is aligned with an optoelectronic transducer 43, and also with a transducer lens 47.

Figure 5C:
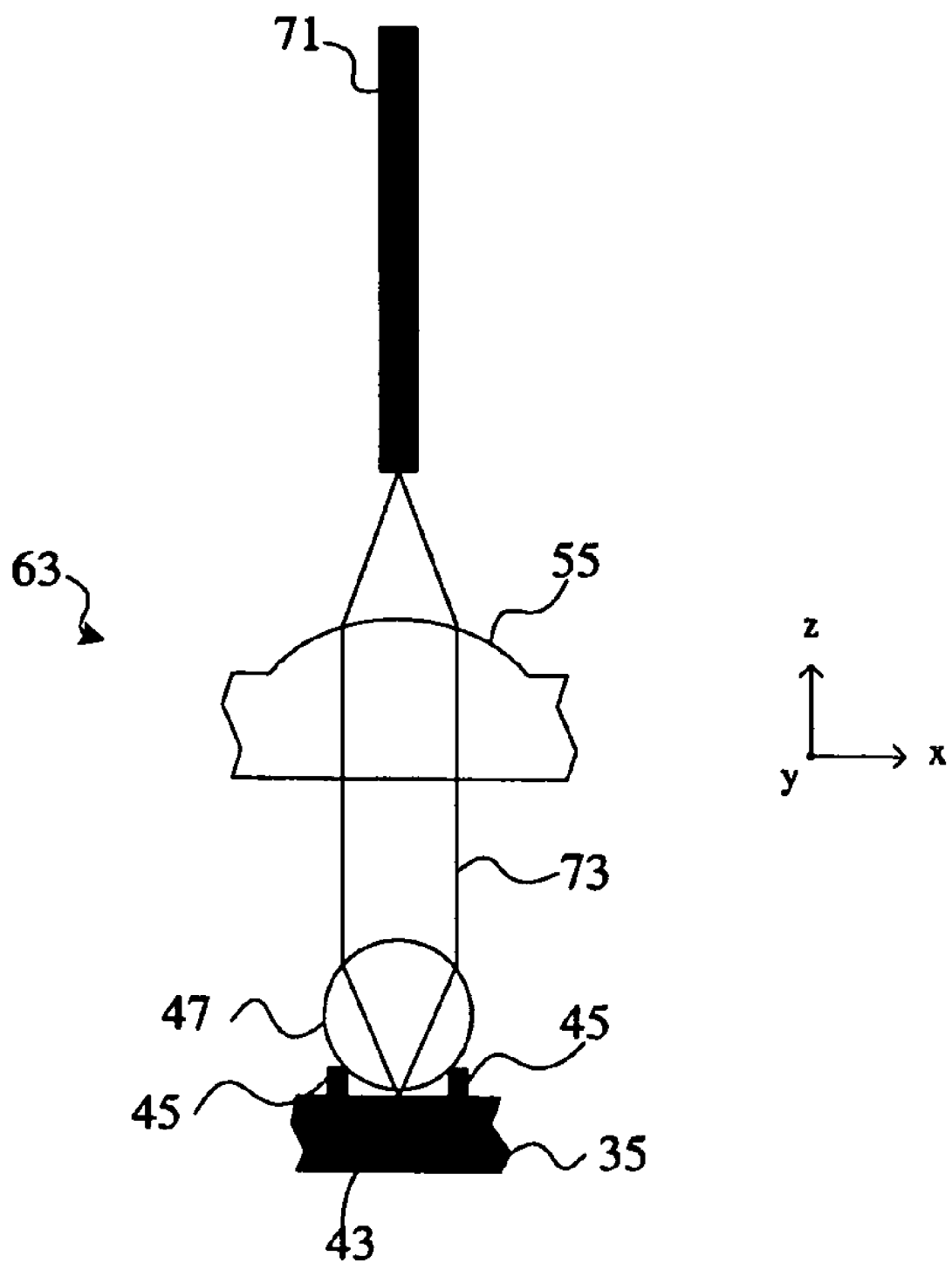

FIG. 5C shows an exploded view of the dotted box 63 of FIG. 5B. An optical fiber 71 has been added to this figure to help illustrate an exemplary light path 73. The X-, Y-, and Z-axis directions are defined as shown in FIG. 5C. The Y-axis is defined to be pointing in a direction out of and perpendicular to the plane of the drawing.

The optoelectronic assembly 31 may be a transmitter or a receiver. When the optoelectronic assembly 31 is a transmitter, the transducer 43 is a light source such as a laser diode. The transducer lens 47 collimates the light from the transducer, and the OLE lens 55 focuses it onto the target optical fiber 71. When the optoelectronic assembly 31 is a receiver, the transducer is a photodetector such as a PIN photodiode and the functions of the components are reversed: the optical fiber 71 functions as a light source; the OLE lens 55 collimates light emitting from the optical fiber 71; and the transducer lens 47 focuses the collimated light onto the target transducer 43.

As previously described, the transducer lens 47 is already precisely aligned to the transducer 43 by the standing structures 45. Consequently, there is more tolerance in the alignment between the transducer lens 47 and the OLE lens 55. Furthermore, the light beam 73 is collimated between the transducer lens 47 and OLE lens 55. If the alignment between the transducer lens 47 and the OLE lens 55 in the XY-plane is slightly off, only a small amount of light is lost, but the optical signal will still be focused on its target. Finally, the distance between the transducer lens 47 and the OLE lens 55 is not so critical, since the light beam 73 is collimated between the lenses.

This two-lens system introduces enough tolerance within the optoelectronic assembly 31 to allow the OLE 33 to be coupled to the substrate 35 without using active alignment. The amount of tolerance will vary depending on the coupling efficiencies needed. Lower speed or shorter distance applications will allow for larger tolerances, whereas higher speed or longer distance applications will require tighter tolerances.

Figure 6A:
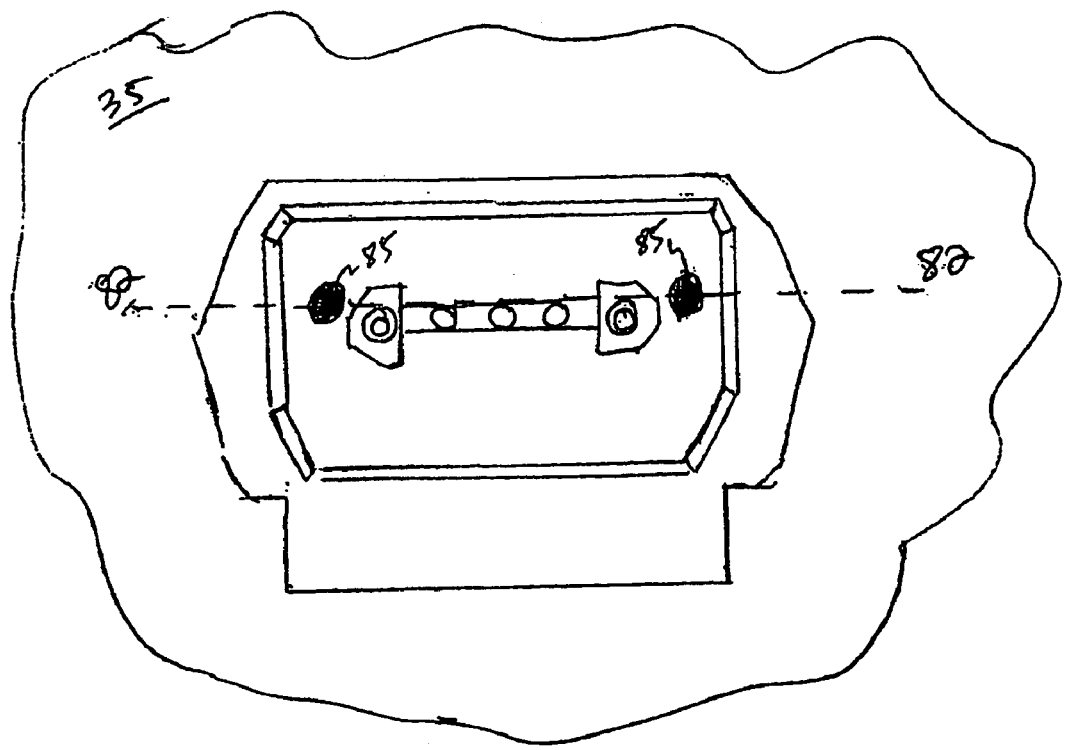
FIGS. 6A–6B show an optoelectronic assembly in another embodiment made in accordance with the teachings of the present invention.
Figure 6B:
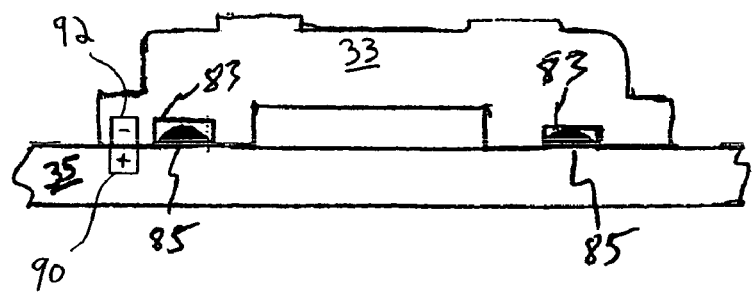

FIGS. 6A–6B show an optoelectronic assembly 81 in another embodiment made in accordance with the teachings of the present invention. Optoelectronic assembly 81 is similar to optoelectronic assembly 31 except for the coupling mechanism. In this embodiment, the OLE 33 has female alignment features while the substrate 35 has male co-alignment features. The female alignment features on OLE 33 are sockets 83. The male co-alignment features on the substrate 35 are bumps 83 designed to snap-fit, slip-fit, or press-fit with the sockets 83. In an exemplary embodiment, the bumps 83 are solder balls.

To form the bumps 83, solder balls with very accurate diameters are placed on the substrate 35 and reflowed, forming bumps 83 with precise dimensions. The substrate 35 can be flat with precisely formed metal features (e.g. traces) onto which the solder balls are placed, reflowed and thus attached to the metal features. Alternatively, the substrate 35 can have pits into which the solder balls are placed and attached. This method is especially effective if the substrate is formed of silicon, because the pits can then be precisely formed using semiconductor etching techniques.

In other embodiments of the invention, the coupling mechanism may be visual fiducials. For example, the alignment feature maybe an outline drawn on the substrate within which the optical element should be attached using adhesive, solder, or other attachment means. The coupling mechanism may also be magnetic. For example, the substrate 35 can have magnetic contacts 90 of one polarity, and the optical element 33 can have magnetic contacts 92 of the opposite polarity.

Although the present invention has been described in detail with reference to particular preferred embodiments, persons possessing ordinary skill in the art to which this invention pertains will appreciate that various modifications and enhancements may be made without departing from the spirit and scope of the claims that follow.

We claim:

1. An optoelectronic assembly, comprising:
   a substrate having at least one alignment feature;
   an optoelectronic transducer on the substrate;
   a standing structure optically patterned on a surface of the optoelectronic transducer;
   a first lens supported by the standing structure;
   an optical lens element (OLE) having a co-alignment feature that couples with the alignment feature on the substrate; and a second lens in the OLE,
   wherein the coupling of the alignment feature and the co-alignment feature aligns the second lens with the first lens.

2. An optoelectronic assembly as in claim 1, wherein at least one of the first and second lenses is operable for collimating light.

3. An optoelectronic assembly as in claim 2, wherein the standing structure is formed using photolithographic processing techniques.

4. An optoelectronic assembly as in claim 2, wherein
   the optoelectronic transducer is a laser, and
   the first lens collimates light emitting from the laser.

5. An optoelectronic assembly as in claim 4, wherein the optoelectronic transducer is a laser, and the second lens collimates light emitting from the laser.

6. An optoelectronic assembly as in claim 2, wherein the optoelectronic transducer is a photodetector, and the first lens focuses light upon the photodetector.

7. An optoelectronic assembly as in claim 1, wherein the alignment feature is a socket in the substrate and the co-alignment feature is a plug on the OLE.

8. An optoelectronic assembly as in claim 1, wherein the alignment feature is a plug on the substrate and the co-alignment feature is a socket in the OLE.

9. An optoelectronic assembly as in claim 8, wherein the alignment feature is a solder ball.

10. An optoelectronic assembly as in claim 1, wherein
   the optoelectronic transducer is one device in any array of optoelectronic transducers;
   the first lens is one lens in an array of first lenses, each first lens positioned over an optoelectronic transducer; and
   the second lens is one lens in an array of second lenses, each of the second lenses aligned with a first lens in the array of first lenses.

11. An optoelectronic assembly as in claim 2, wherein first lens is a ball lens.

12. An optoelectronic assembly as in claim 1, wherein the OLE is molded as a single component.

13. An optoelectronic assembly as in claim 12, wherein the OLE has connectors for connecting with a fiber optic ferrule.

14. An optoelectronic assembly as in claim 13, further comprising
   an optical fiber having a fiber optic ferrule coupled to the connectors, aligning the second lens with the optical fiber.

15. An optoelectronic assembly as in claim 14, wherein the optical fiber is a multi-mode fiber.

16. An optoelectronic assembly as in claim 1, wherein the alignment feature and couples with the co-alignment feature via a magnetic coupling.

17. An optoelectronic assembly as in claim 1, wherein the alignment feature on the substrate is a visual fiducial.

18. An optoelectronic assembly comprising:
   a substrate defining an alignment socket and including:
      an optoelectronic transducer fixed relative to the alignment socket,
      a standing structure patterned on the optoelectronic transducer,
      a lens contacting the standing structure; and
   an optical lens element (OLE) defining an alignment plug and an OLE lens fixed relative to the alignment plug;
      wherein coupling the alignment plug of the OLE into the alignment socket of the substrate aligns the lens contacting the standing structure with the OLE lens.

19. The optoelectronic assembly of claim 18, wherein the standing structure positions the lens contacting the standing structure at a focal point of the optoelectronic transducer.

20. An optoelectronic assembly as in claim 1, wherein the standing structure is photolithographically patterned on the surface of the optoelectronic transducer.

21. An optoelectronic assembly as in claim 1, wherein the standing structure is optically patterned on the surface of the optoelectronic transducer to position the first lens at a focal point of the optoelectronic transducer.

* * * * *

UNITED STATES PATENT AND TRADEMARK OFFICE
CERTIFICATE OF CORRECTION

| | | |
|---|---|---|
| PATENT NO. | : 7,233,723 B2 | Page 1 of 1 |
| APPLICATION NO. | : 10/903564 | |
| DATED | : June 19, 2007 | |
| INVENTOR(S) | : James Williams | |

It is certified that error appears in the above-identified patent and that said Letters Patent is hereby corrected as shown below:

Col. 6 line 5
In Claim 14, after "comprising"
insert -- : --.

Col. 6 line 12
In Claim 16, after "feature" delete "and".

Signed and Sealed this

Fifteenth Day of July, 2008

JON W. DUDAS
*Director of the United States Patent and Trademark Office*